United States Patent [19]

Nordstrom

[11] E Patent Number: Re. 33,128

[45] Reissued Date of Patent: Dec. 12, 1989

[54] PAPERBOARD CONTAINER FOR LIQUIDS INCLUDING MEANS TO PREVENT FITMENT ROTATION

[75] Inventor: Duane M. Nordstrom, Kelso, Wash.

[73] Assignee: Longview Fibre Company, Longview, Wash.

[21] Appl. No.: 182,716

[22] Filed: Apr. 18, 1988

Related U.S. Patent Documents

Reissue of:

[64] Patent No.: 6,660,593
Issued: May 19, 1987
Appl. No.: 766,535
Filed: Aug. 19, 1985

[51] Int. Cl.[4] ..... B65D 90/04

[52] U.S. Cl. ..... 220/465; 220/462; 222/83; 222/105; 222/183; 229/41 C

[58] Field of Search ..... 220/461, 462, 465, 466, 220/468, 470, 410, 441, 463; 229/41 C, 23 A, 44 R, 131.1, 132, 108, 109; 222/83, 105, 181, 183, 541, 88, 89

[56] References Cited

U.S. PATENT DOCUMENTS

| | | | |
|---|---|---|---|
| 324,114 | 8/1885 | Jaeger | 229/131.1 X |
| 1,115,060 | 10/1914 | Eaton | 229/132 |
| 3,138,293 | 6/1964 | Roak et al. | 222/105 |
| 3,169,690 | 2/1965 | Scholle | 220/465 X |
| 3,206,075 | 9/1965 | Scholle | 222/105 |
| 3,239,104 | 3/1966 | Scholle | 222/89 X |
| 3,349,965 | 10/1967 | Krugger | 222/105 X |
| 3,363,807 | 1/1968 | Powell | 222/183 |
| 3,937,392 | 2/1976 | Swisher | 229/108 X |
| 3,972,454 | 8/1976 | Croley | 222/541 |
| 4,042,164 | 8/1977 | Croley | 229/108 X |
| 4,174,051 | 11/1979 | Edwards et al. | 222/105 |
| 4,421,253 | 12/1983 | Croley | 222/105 |
| 4,475,670 | 10/1984 | Rutter | 222/83 |
| 4,549,673 | 10/1985 | Kupersmit | 220/465 |
| 4,585,143 | 4/1986 | Fremow et al. | 220/462 |
| 4,771,917 | 9/1988 | Heaps, Jr. et al. | 222/105 X |

FOREIGN PATENT DOCUMENTS

| | | | |
|---|---|---|---|
| 2037711 | 7/1980 | United Kingdom | 220/461 |

*Primary Examiner*—Bryon P. Gehman
*Attorney, Agent, or Firm*—Olson & Olson

[57] ABSTRACT

A container is formed of a pair of paperboard tubes opened at both ends and one telescoped within the other. A bottom inner closure cap closes the open bottom end of the inner tube and has a plurality of peripheral flaps inserted between the inner and outer tubes. One of the flaps is hinged to a tab portion of the inner closure cap which extends partially into the inner cap and terminates at its inner end in a transverse score line to allow the tab to be hinged outward of the cap for inserting a flexible plastic liner into the inner tube. A fitment on the liner is extended outward through, aligned openings in the flap and inner and outer tubes. An outer bottom cap covers the inner bottom cap and the fitment extends outwardly through an opening in its peripheral wall. With the assembly supported on a pallet, liquid is filled into the liner from its open top, the liner then is closed within the inner tube and a top outer cap is fitted over the top end of the outer tube. The filled container may be secured to the pallet, as by strapping, preparatory to transporting by lift truck. A control valve and probe subsequently is threaded into the fitment for cutting open the liner for the controlled dispensing of the liquid from the container.

6 Claims, 1 Drawing Sheet

PAPERBOARD CONTAINER FOR LIQUIDS INCLUDING MEANS TO PREVENT FITMENT ROTATION

Matter enclosed in heavy brackets [ ] appears in the original patent but forms no part of this reissue specification; matter printed in italics indicates the additions made by reissue.

BACKGROUND OF THE INVENTION

This invention relates to containers for liquids, and more particularly to such containers made of inexpensive paperboard.

The transport, storage and dispensing of liquids heretofore generally has utilized metal or fiberglass containers which, because of their excessive cost, must be cleaned and returned or otherwise processed for re-use. Relatively inexpensive paperboard containers heretofore have only been used for the transport and storage of solid particulate material. Such containers are exemplified by U.S. Pat. No. 3,937,392. Paperboard containers with liquid impervious liners also have been provided heretofore, but they have too small capacity for efficient utility and their constructions are so complex and costly as to require re-use. Exemplary of such paperboard containers are those disclosed in U.S. Pat. Nos. 3,182,571; 3,219,240; and 3,266,390. Moreover, all known containers capable of transporting and dispensing at least 200 gallons of liquid are characterized by requiring at least about 45 minutes to set up and fill, thereby incurring excessive cost of plant operation.

SUMMARY OF THE INVENTION

This invention provides a container for liquids which is made of inexpensive paperboard components which include a tubular wall closed at the bottom by inner and outer caps and at the top by an outer cap, a flexible plastic liner being contained within the tubular wall and a fitment on the liner is extended outward through registering openings in the tubular wall and bottom caps.

A principle objective of this invention is to provide a container for liquids and a method of assembly thereof which overcomes the aforementioned disadvantages and limitations of prior liquid containers.

Another object of this invention is to provide a liquid container of the class described which is made of inexpensive paperboard, whereby to be expendable after a single use.

Still another object of this invention is to provide a liquid container of the class described which is made of paperboard and yet capable of containing, transporting and dispensing several hundred gallons of liquid.

A further objective of this invention is to provide a liquid container of the class described which is made of economical paperboard and arranged to accommodate installation of a flexible plastic liner with speed and facility.

Another objective of this invention is to provide a liquid container of the class described that is capable of assembly and filling with speed and facility.

The foregoing and other objects and advantages of this invention will appear from the following detailed description, taken in conjunction with the accompanying drawings of a preferred embodiment.

DESCRIPTION OF THE PREFERRED EMBODIMENT

Figure 1:
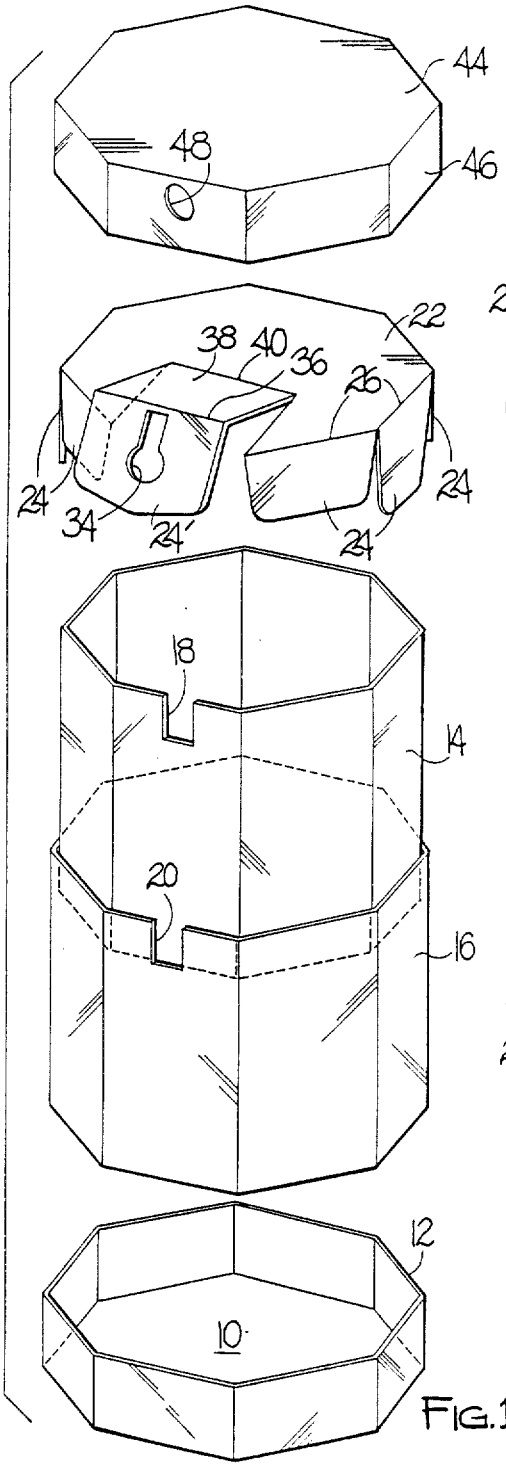
FIG. 1 is an exploded perspective view illustrating a preferred method of assembling the components of a container embodying the features of this invention.

For ease of understanding of the structural components and method of assembly, reference is made primarily to the exploded view of FIG. 1 of the drawings. This view illustrates the arrangement of components in an intermediate stage of assembly, from which the assembly will be inverted preparatory to filling with liquid.

Thus, the bottommost component illustrated in FIG. 1 is a top cap member 10 provided with a peripheral wall 12. It preferably is made of corrugated paperboard. The top cap member is placed upon a support surface, such as a floor, table or pallet, with the peripheral wall extending upward.

A hollow tubular wall member, open at both ends, preferably is formed of inner and outer tube members 14 and 16, respectively, which, like the top cap member, preferably is made of corrugated paperboard. In the embodiment illustrated, the outer tube member 16 is inserted at one end into the top cap member 10 so that the peripheral wall 12 of the latter extends upward along the outer sides of the outer tube member.

The inner tube member 14 of the wall then is inserted into the outer tube member 16 and slid downward until it also abuts the top cap member 10.

For purposes explained more fully hereinafter, the ends of the inner and outer tube members are provided with rectangular openings 18 and 20, respectively, which register with each other in the assembled condition illustrated.

In the illustrated embodiment, the container is in the shape of an octagon, produced by bending blank stock along appropriately positioned score lines. However, it will be understood that any desired shape may be elected.

The upper end of the tubular wall is closed first by an inner bottom cap member 22 of inexpensive paperboard, preferably a solid fiber paperboard as distinguished from corrugated paperboard. Solid fiber provides this cap member with increased strength and toughness and allows it to be provided in thinner cross section than corrugated paperboard, for easy insertion between the tubes 14 and 16. This inner bottom cap member is provided with a plurality of peripheral flaps 24 defined by score lines 26 which allow the flaps to be bent substantially normal to the plane of the cap member to extend along the outer side of the tubular wall toward the top cap member. In the embodiment illustrated, wherein the tubular wall is formed of inner and outer tube members 14 and 16, the flaps of the bottom inner cap member are fitted in between the inner and outer tube members.

Prior to final installation of the bottom inner cap member 22, a liquid impervious liner 28 of flexible material, such as polyethylene or other suitable synthetic resin, is inserted into the interior of the tubular wall. This may be achieved by placing the liner within the tubular wall prior to the installation of the bottom inner cap member 22, or by partially installing the bottom inner cap member at an angle to the edge of the tubular wall, leaving sufficient space therebetween for insertion of the liner.

Figure 3:
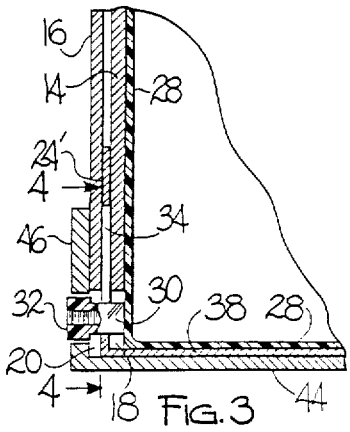
FIG. 3 is a fragmentary sectional view of the completed assembly of FIG. 1 showing the disposition of a dispensing valve fitment at the bottom of the container.
Figure 4:
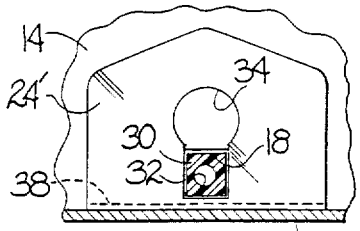
FIG. 4 is a fragmentary sectional view taken on the line 4—4 in FIG. 3.

The liner is provided with a fitment 30 to which a dispensing control valve subsequently may be attached, preparatory to the controlled dispensing of liquid from the container. Such a fitment is illustrated in FIG. 3 as a short length of tubing bonded at its inner end to the outer surface of the liner 28 and provided with an internal threaded bore 32 for the threaded attachment of a dispensing valve.

Such a dispensing valve is provided with a probe which, in the process of threaded attachment to the fitment, effects cutting of the portion of the liner which has closed the inner end of the fitment tubing. The perforation of the liner in this manner enables the liquid confined within the liner to exit through the control valve.

In the installation of the liner 28 within the tubular wall, it is necessary that the fitment 30 extend outward through the wall so as to be exposed for attachment of the control valve. This extension of the fitment is provided by an opening 34 in one of the flaps 24' of the bottom inner cap member 22. In the embodiment illustrated, this opening is in the form of a keyhole. Thus, the fitment may be passed outward through the enlarged circular portion of the keyhole and then the tubing portion of the fitment is moved into the rectangular portion of the keyhole. The portion of the fitment tubing extending through the rectangular portion of the keyhole is square in external cross-section, whereby the rectangular portion of the keyhole prevents rotation of the fitment. This facilitates attachment of the control valve and prevents twisting of the fitment relative to the liner 28. It also holds the fitment in place during shipment.

Figure 2:
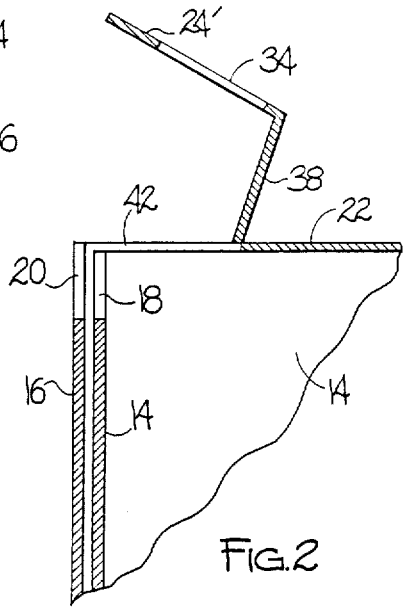
FIG. 2 is a fragmentary sectional view of the assembly of FIG. 1 in an intermediate stage of assembly preliminary to installation of a flexible, liquid impervious liner.

In the preferred embodiment illustrated, the flap 24' provided with the keyhole opening 34 is attached by a score line 36 to a tab portion 38 of the bottom inner cap member 22. This tab portion is defined by a pair of laterally spaced cuts connected at their inner ends by a transverse score line 40. The tab portion thus is hinged to the bottom inner cap member 22 at the score line, whereby to allow the tab member to be hinged outwardly along with the attached flap 24'. This outward hinging of the tab member and flap provides an opening 42 (FIG. 2) through the bottom inner cap member of sufficient size to accommodate insertion of the liner 28 into interior of the inner tube member 14.

After the liner has been inserted into the inner tube member, and the fitment extended outward through the keyhole 34, the tab portion 38 of the cap member is swung downward to close the opening 42 and the flap 24' is inserted between the inner and outer tube members. The keyhole 24 in the flap registers with the rectangular openings 18 and 20 in the inner and outer tube members, whereby the fitment 30 extends outward therethrough.

In the event the tab portion 38 is not provided, the liner 28 may be inserted into the interior of the tube 14 before the flaps 24 are inserted. Alternatively, the flaps 24 may be inserted partially between the tubes 14 and 16, with the cap member 22 cocked slightly at an angle to provide sufficient space between it and the upper end of the tubes for insertion of the liner. In either case the fitment 30 is extended through the keyhole 34 before the flap 24' is slipped between the tubes.

With the bottom inner cap member 22 thus installed in final position closing the end of the tubular wall opposite the top cap member 10, a bottom outer cap member 44 is installed over the bottom inner cap member. The bottom outer cap member is provided with a peripheral wall 46 which extends along the outer side of the outer tube member 16 toward the top cap member 10. A circular opening 48 in the peripheral wall of the bottom outer cap member is provided for the reception of the circular portion of fitment 30 outwardly therethrough, as will be understood.

With the components assembled as thus described, it is inverted, end for end, with the bottom outer cap member 44 now resting upon a supporting surface, preferably a pallet by which a transport the assembly when filled. Filling is accomplished by removing the top outer cap member 10 to expose the interior of the tubular wall. The liquid impervious liner 28 thus is exposed, whereby its open upper end may be draped outward over the top end of the tubular wall to facilitate the filling of liquid into its interior. When the lined tubular container has been filled with the desired quantity of liquid, the open upper end of the liner is gathered together over the liquid and closed by any suitable means.

Alternatively, the liner may be of the type having a closed upper end provided with a filler fitment which may be opened for filling the liner with liquid. Thereafter, the filler fitment is closed.

When the liner has been closed, the top outer cap member 10 is reinstalled over the open upper end of the the tubular wall.

Reinforcement strappings may be utilized to encircle the peripheral walls of the top and bottom outer cap members, and similar strappings may be utilized to secure the filled container to the supporting pallet, preparatory to transporting the assembly by lift truck or other suitable means to a source of shipment and/or a location at which the liquid is to be dispensed.

At the dispensing site, a probe and dispensing control valve is threaded into the fitment 30, thereby automatically cutting the liner 28 in the area closing the inner end of the fitment. The liquid thus may be dispensed by gravity from the container through the control valve, in any manner desired.

From the foregoing, it will be appreciated that the present invention provides a container which, by virtue of its construction of inexpensive paperboard, may be utilized only once and then discarded, if desired. Alternatively, it may be utilized many times over, for a variety of uses in addition to the storage, transport and dispensing of liquids. For example, it may be utilized as a trash container of signficant size and strength. If desired, it may be collapsed to sufficiently small size as to render feasible its return to the source of shipment.

As an illustration, the container described hereinbefore has been made in the manner described to successfully transport and dispense 300 gallons of liquid adhesive. For that purpose the container is made of corrugated paperboard for the inner and outer tube members and the top and bottom outer cap members. The bottom inner cap member preferably is made of solid fiber paperboard for perimeter reinforcement for the liquid and for puncture resistance to prevent rupture of the container upon inadvertent contact of lift truck forks in the process of picking up the filled container mounted on a pallet.

In this latter regard, it is to be noted in FIG. 1 that the flap 24' containing the key hole 34, and every other flap spaced therefrom, are made longer than the intermediate flaps. The container is positioned on a pallet such that the longer flaps are disposed parallel to the edges of the pallet and thus are positioned for protecting the container against inadvertent contact and penetration by lift truck forks.

In the embodiment illustrated, the tubular wall is shown to be formed of inner and outer tube members 14 and 16, respectively, with the inner tube member telescoped slidably within the outer tube member. As an alternative, the inner and outer tube members may be preformed as an integral unit by bonding them together in the telescoped position. In such instance, it is necessary to leave the inner and outer tube members unbonded in the area in which the flaps 24 of the bottom inner cap member 22 are to be slipped in between the inner and outer tube members.

In the assembly procedure described, the top cap member 10 is placed upon a support and the top end of the wall tube 16 inserted into it. After inverting the assembly preparatory to filling the liquid, the top cap member 10 is removed. As an alternative procedure, the top end of the outer wall tube 16 is placed upon a forming support, absent the top cap member 10. The latter is installed over the top end of the outer tube 16 after the container is filled.

It will be apparent to those skilled in the art that the foregoing and other modifications and changes may be made in the size, shape, type, number and arrangement of parts described hereinbefore, as well as in the steps of assembly. For example, although the tubular wall is illustrated as formed of two single ply corrugated paperboard tubes 14 and 16, the wall may be formed of any other number of tubes of any number of plies, as desired. This and other changes may be made without departing from the spirit of this invention and the scope of the appended claims.

Having now described my invention and the manner in which it may be used, I claim:

1. A container for liquids, comprising:

(a) an upright tubular wall open at its top and bottom ends, (b) a bottom inner cap member closing the bottom end of the tubular wall, (c) a plurality of peripheral flaps extending outwardly from the inner cap member and arranged to extend along the inner side of the tubular wall, (d) registering fitment openings through one of the peripheral flaps of the bottom inner cap member and through the tubular wall, (e) a flexible liquid impervious liner in the interior of the tubular wall, (f) a fitment on the liner extending outwardly through the registering fitment openings in the flap and wall, the fitment having opposed flat external longitudinal surfaces and one or both of the registering openings in the flap and wall being configured to receive said flat external surfaces of the fitment to prevent rotation of the fitment, (g) a bottom outer cap member covering the inner cap member and having a peripheral wall extending along the outer bottom side portion of the tubular wall, (h) a fitment opening in the peripheral wall of the bottom outer cap member receiving the fitment therethrough, and (i) a top cap member closing the top end of the tubular wall and having a peripheral wall extending along the outer top side portion of the tubular wall.

2. The container of claim 1 wherein the bottom inner cap member has a hinged tab portion supporting the peripheral flap having the fitment opening, the tab portion being movable outwardly to form an access opening to the interior of the tubular wall through which to insert the liner.

3. The container of claim 2 wherein the bottom inner cap member is made of paperboard and the tab portion is defined by laterally spaced cuts extending inwardly from the associated peripheral flap, a transverse scoring extends between the inner ends of the cuts to form a hinge for moving the tab portion relative to the cap member, and a transverse scoring hingedly interconnects the tab portion and the associated flap.

4. The container of claim 1 wherein the upright tubular wall comprises inner and outer tube members, and the peripheral flaps on the bottom inner cap member extends between the inner and outer tube members.

5. The container of claim 1 wherein the tubular wall and top and bottom outer cap members are made of corrugated paperboard, and the bottom inner cap member is made of solid fiber paperboard.

*6. A container for liquids, comprising:*

*(a) an upright tubular wall open at its top and bottom ends,*

*(b) a bottom cap member closing the bottom end of the tubular wall,*

*(c) a plurality of peripheral flaps extending outwardly from the bottom cap member and arranged to extend along the inner side of the tubular wall,*

*(d) registering fitment openings through one of the peripheral flaps of the bottom cap member and through the tubular wall,*

*(e) a flexible liquid impervious liner in the interior of the tubular wall,*

*(f) a fitment on the liner extending outwardly through the registering fitment openings in the flap and wall, the fitment having opposed flat external longitudinal surfaces and one or both of the registering openings in the flap and wall being configured to receive said flat external surfaces of the fitment to prevent rotation of the fitment, and*

*(g) a top cap member closing the top end of the tubular wall.*

* * * * *

UNITED STATES PATENT AND TRADEMARK OFFICE

CERTIFICATE OF CORRECTION

PATENT NO. : Re. 33,128

DATED : December 12, 1989

INVENTOR(S) : DUANE M. NORDSTROM

It is certified that error appears in the above-identified patent and that said Letters Patent is hereby corrected as shown below:

On Abstract page, first column at item 64, the patent Number should read: -- 4,666,059 --.

Signed and Sealed this

Twenty-third Day of October, 1990

*Attest:*

HARRY F. MANBECK, JR.

*Attesting Officer*

*Commissioner of Patents and Trademarks*

US001033128A

REEXAMINATION CERTIFICATE (1784th)

United States Patent [19]

[11] B1 Re. 33,128

Nordstrom

[45] Certificate Issued Sep. 15, 1992

[54] PAPERBOARD CONTAINER FOR LIQUIDS INCLUDING MEANS TO PREVENT FITMENT ROTATION

[76] Inventor: Duane M. Nordstrom, Kelso, Wash.

Reexamination Request:
No. 90/002,502, Nov. 7, 1991

Reexamination Certificate for:

| | |
|---|---|
| Patent No.: | Re. 33,128 |
| Issued: | Dec. 12, 1989 |
| Appl. No.: | 182,716 |
| Filed: | Apr. 18, 1988 |

Related U.S. Patent Documents

Reissue of:

| | |
|---|---|
| [64] Patent No.: | 4,666,059 |
| Issued: | Dec. 12, 1989 |
| Appl. No.: | 66,535 |
| Filed: | Aug. 19, 1985 |

[51] Int. Cl.[5] ..... B65D 90/04

[52] U.S. Cl. ..... 220/465; 220/462; 222/83; 222/105; 222/183

[58] Field of Search ..... 220/461–463, 220/465, 466, 468, 470, 410, 441; 222/83, 105, 88, 89, 181, 183, 541; 229/234, 131.1, 132, 108, 109

[56] References Cited

U.S. PATENT DOCUMENTS

| | | | |
|---|---|---|---|
| 324,114 | 8/1885 | Jaeger | 229/131.1 X |
| 1,115,060 | 10/1914 | Eaton | 229/132 |
| 3,087,655 | 4/1963 | Scholle | 222/183 |
| 3,138,293 | 6/1964 | Roak et al. | 222/105 |
| 3,169,690 | 2/1965 | Scholle | 220/465 X |
| 3,206,075 | 9/1965 | Scholle | 222/105 |
| 3,239,104 | 3/1966 | Scholle | 222/89 X |
| 3,349,965 | 10/1967 | Krugger | 222/105 X |
| 3,363,807 | 1/1968 | Powell | 222/183 |
| 3,937,392 | 2/1976 | Swisher | 229/108 X |
| 3,972,454 | 8/1976 | Croley | 222/541 |
| 4,042,164 | 8/1977 | Croley | 229/108 X |
| 4,174,051 | 11/1979 | Edwards et al. | 222/105 |
| 4,322,018 | 3/1982 | Rutter | 222/83 |
| 4,421,253 | 12/1983 | Croley | 222/105 |
| 4,475,670 | 10/1984 | Rutter | 222/83 |
| 4,549,673 | 10/1985 | Kupersmit | 222/465 |
| 4,585,143 | 4/1986 | Fremow et al. | 220/462 |
| 4,771,917 | 9/1988 | Heaps, Jr. et al. | 222/105 X |

FOREIGN PATENT DOCUMENTS

| | | | |
|---|---|---|---|
| 0053891 | 6/1982 | European Pat. Off. . | |
| 1586801 | 6/1967 | Fed. Rep. of Germany . | |
| 2480731 | 4/1981 | France . | |
| 1163489 | 9/1969 | United Kingdom . | |
| 1168465 | 10/1969 | United Kingdom . | |
| 2037711 | 7/1980 | United Kingdom | 220/461 |

*Primary Examiner*—Bryon P. Gehman

[57] ABSTRACT

A container is formed of a pair of paperboard tubes opened at both ends and one telescoped within the other. A bottom inner closure cap closes the open bottom end of the inner tube and has a plurality of peripheral flaps inserted between the inner and outer tubes. One of the flaps is hinged to a tab portion of the inner closure cap which extends partially into the inner cap and terminates at its inner end in a transverse score line to allow the tab to be hinged outward of the cap for inserting a flexible plastic liner into the inner tube. A fitment on the liner is extended outward through, aligned openings in the flap and inner and outer tubes. An outer bottom cap covers the inner bottom cap and the fitment extends outwardly through an opening in its peripheral wall. With the assembly supported on a pallet, liquid is filled into the liner from its open top, the liner then is closed within the inner tube and a top outer cap is fitted over the top end of the outer tube. The filled container may be secured to the pallet, as by strapping, preparatory to transporting by lift truck. A control valve and probe subsequently is threaded into the fitment for cutting open the liner for the controlled dispensing of the liquid from the container.

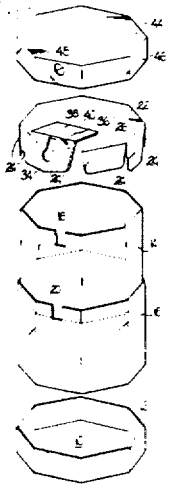

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the reissue patent, but has been deleted and is no longer a part of the reissue patent; manner printed in italics indicates additions made to the reissue patent.

AS A RESULT OF REEXAMINATION, IT HAS BEEN DETERMINED THAT:

The patentability of claims 1–6 is confirmed.

New claims 7 and 8 are added and determined to be patentable.

*7. The container of claim 1 wherein the one of said peripheral flaps containing a fitment opening and every other flap spaced therefrom are larger than the intermediate ones of said flaps.*

*8. The container of claim 6 wherein the one of said peripheral flaps containing a fitment opening and every other flap spaced therefrom are larger than the intermediate ones of said flaps.*

* * * * *

US001033128B1

REEXAMINATION CERTIFICATE (3095th)

United States Patent [19] [11] B2 Re. 33,128

Nordstrom [45] Certificate Issued Jan. 7, 1997

[54] PAPERBOARD CONTAINER FOR LIQUIDS INCLUDING MEANS TO PREVENT FITMENT ROTATION

[75] Inventor: Duane M. Nordstrom, Kelso, Wash.

[73] Assignee: Longfibre Company, Longview, Wash.

Reexamination Request:
No. 90/004,221, Apr. 11, 1996

Reexamination Certificate for:

| | |
|---|---|
| Patent No.: | **Re. 1,033,128** |
| Issued: | **Dec. 12, 1989** |
| Appl. No.: | **182,716** |
| Filed: | **Apr. 18, 1988** |

Reexamination Certificate B1 Re. 1,033,128 issued Sep. 15, 1992

Certificate of Correction issued Oct. 12, 1993.

Related U.S. Patent Documents

Reissue of:

| | | |
|---|---|---|
| [64] | Patent No.: | **4,666,059** |
| | Issued: | **May 15, 1987** |
| | Appl. No.: | **766,535** |
| | Filed: | **Aug. 19, 1985** |

[51] Int. Cl.[6] ..... B65D 90/04

[52] U.S. Cl. ..... 220/465; 220/462; 222/83; 222/105; 222/183

[58] Field of Search ..... 220/461–463, 220/465, 466, 468, 470, 410, 441; 222/83, 105, 88, 89, 181, 183, 541.1; 229/108, 109, 131.1, 132, 234

[56] References Cited

U.S. PATENT DOCUMENTS

| | | | |
|---|---|---|---|
| 3,087,655 | 4/1963 | Scholle | 222/183 |
| 3,138,293 | 6/1964 | Roak et al. | 222/105 |
| 3,349,965 | 10/1967 | Krugger | 222/105 X |
| 3,937,392 | 2/1976 | Swisher | 229/108 X |
| 4,166,567 | 9/1979 | Beach, Jr. et al. . | |
| 4,322,018 | 3/1982 | Rutter | 222/83 |
| 4,421,253 | 12/1983 | Croley | 222/105 |
| 4,549,673 | 10/1985 | Kupersmit | 220/465 |

FOREIGN PATENT DOCUMENTS

| | | |
|---|---|---|
| 1586801 | 6/1967 | Germany . |
| 1168465 | 10/1969 | United Kingdom . |

*Primary Examiner*—Bryon P. Gehman

[57] ABSTRACT

A container is formed of a pair of paperboard tubes opened at both ends and one telescoped within the other. A bottom inner closure cap closes the open bottom end of the inner tube and has a plurality of peripheral flaps inserted between the inner and outer tubes. One of the flaps is hinged to a tab portion of the inner closure cap which extends partially into the inner cap and terminates at its inner end in a transverse score line to allow the table to be hinged outward of the cap for inserting a flexible plastic liner into the inner tube. A fitment on the liner is extended outward through, aligned openings in the flap and inner and outer tubes. An outer bottom cap covers the inner bottom cap and the fitment extends outwardly through an opening in its peripheral wall. With the assembly supported on a pallet, liquid is filled into the liner from its open top, the liner then is closed within the inner tube and a top outer cap is fitted over the top end of the outer tube. The filled container may be secured to the pallet, as by strapping, preparatory to transporting by lift truck. A control valve and probe subsequently is threaded into the fitment for cutting open the liner for the controlled dispensing of the liquid from the container.

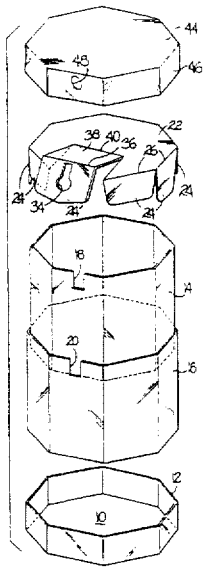

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–8 is confirmed.

* * * * *